United States Patent [19]

Szarka

[11] 4,223,831

[45] Sep. 23, 1980

[54] SOUND ACTIVATED TEMPERATURE CONTROL SYSTEM

[76] Inventor: Jay R. Szarka, 11 Orchard St., Milford, N.H. 03055

[21] Appl. No.: 13,144

[22] Filed: Feb. 21, 1979

[51] Int. Cl.³ .................. G05D 23/00; G08B 13/16
[52] U.S. Cl. ............................. 236/47; 165/27; 236/1R
[58] Field of Search ............ 236/47 R, 1 R; 165/11, 165/27; 340/558

[56] References Cited

U.S. PATENT DOCUMENTS

| | | | |
|---|---|---|---|
| 3,011,718 | 12/1961 | Joerren et al. | 236/49 X |
| 3,613,093 | 10/1971 | Reynolds et al. | 340/558 X |
| 3,974,426 | 8/1976 | Gingras | 236/47 X |
| 4,022,271 | 5/1977 | Monahan | 236/47 X |
| 4,060,123 | 11/1977 | Hoffman et al. | 165/11 |

*Primary Examiner*—William E. Wayner
*Attorney, Agent, or Firm*—Pearson & Pearson

[57] ABSTRACT

The environmental temperature in an area is controlled by the detection of the presence or absence of personnel in a room. A microphone detects sound in the room and actuates a control circuit to establish a set point for a temperature system which supplies heating and cooling to the room. The presence of people in the room is accompanied by sounds which are detected by the microphone to set the set point at an appropriate temperature to provide a comfortable environment. The absence of sound permits a new set point to be used to reduce the energy consumption of the heating or cooling system. A time delay circuit is optionally incorporated to eliminate undesirable cycling.

4 Claims, 3 Drawing Figures

SOUND ACTIVATED TEMPERATURE CONTROL SYSTEM

FIELD OF THE INVENTION

This invention relates to environmental heating and cooling systems and, more particularly, to a demand-responsive temperature control system for reducing the energy consumption of heating and cooling apparatus.

BACKGROUND OF THE INVENTION

With the recent rapid increase in the cost of energy, attention has been focused on the need to conserve natural resources by reducing wasteful and needless consumption of energy. Environmental heating and cooling systems are significant consumers of energy and thus are significant targets for energy conservation. To this end, various control systems have been applied to heating and cooling systems to reduce their energy consumption and increase their overall operating efficiency.

One type of prior art control system simply turns off the heating or cooling system when the associated environment is unoccupied. The turning off and subsequent turning on of the system may be controlled manually or automatically—for example, by a clock if the usage pattern of the environment is well-established and regular. This type of "on-off" control system is unsatisfactory for a number of reasons. First, it permits excessive temperature variations in the environment and these excessive variations may impose an excessive load on the heating or cooling system when it is turned on. Also, it is inappropriate for use in environments wherein excessive temperature variations may cause damage to equipment therein. Further, there may be considerable delays in the area reaching the desired temperature when the system is turned on after it has been off for a considerable period of time. Decreases in fuel consumption will be highly dependent on the extent of the temperature variations experienced and under certain conditions, it is even possible to increase fuel consumption.

A more advanced control system couples a multi-setting thermostat with a clock, with the set point of the thermostat being selected by the clock. For example, in domestic systems of this type two temperature set points may be provided, one for daytime use and another for nightime use. The multi-setting, clock-driven thermostat is an improvement over the "on-off" system in terms of providing a fixed temperature range. However, efficiency still is sacrificed because at times the thermostat may be set by the clock to a higher or lower temperature than is necessary, taking into account the use of the room. Also, when uses are made of the area other than as normally programmed into the clock, the room will not be at the temperature desired for that use.

SUMMARY OF THE INVENTION

By contrast with the prior art, it is an object of the present invention to provide a control system for heating and cooling equipment for passive, demand-responsive operation of such equipment.

This and other, further objects of the present invention are accomplished by an automatic control system that automatically changes the room temperature set point in response to the room being occupied or unoccupied. The occupation status of a room is determined by monitoring ambient noise levels. In one embodiment, four temperature set points are employed, two each for winter and summer, corresponding to unoccupied and occupied conditions. When the ambient noise level indicates that the room is occupied, the appropriate occupied status set point is selected and the heating/cooling equipment is cycled to maintain set point temperature. When the ambient noise level indicates that the room is not occupied, the unoccupied status set point is selected. During all operating conditions, temperature is actually maintained at the appropriate one of the four separate temperature level settings by cycling the heating and cooling system on and off under control of the thermostat. Optionally, a time delay relay may be operated by the control system, with on/off operation of the heating and cooling equipment being under the control of the relay, to prevent excessive cycling of the heating and cooling system in response to brief, transient occupation of the room.

This invention is more particularly pointed out in the appended claims and will be more fully understood with reference to the detailed description which follows below, taken in conjunction with the accompanying drawings.

DETAILED DESCRIPTION OF AN ILLUSTRATIVE EMBODIMENT

Figure 1:
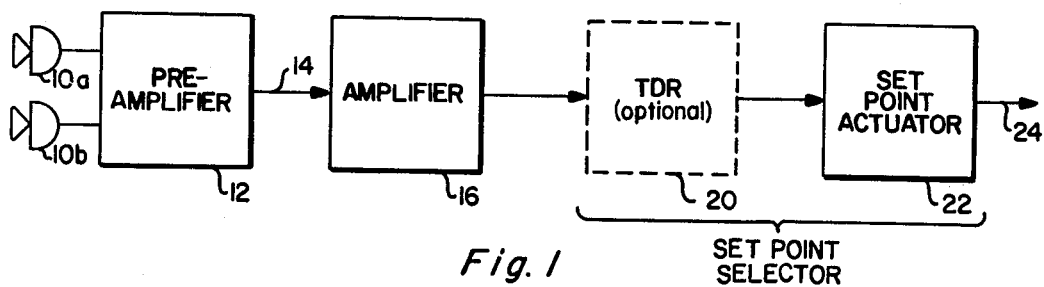
FIG. 1 is a block diagram of the control system of the present invention.

Referring now to FIG. 1, there is shown a block diagram of the present invention as generally applicable to pneumatically controlled, electrically controlled or electronically controlled heating and cooling equipment. One or more audio sensors, such as microphones 10a and 10b, are mounted at various locations in the room whose environment is to be controlled. Preferably omni-directional microphones are used. The outputs of the audio sensors are mixed together in a preamplifier stage 12. Preamplifier 12 both increases the level of the detected audio signals and filters out extraneous signal components. The output of the preamplifier is supplied via line 14 to amplifier 16. The latter has sufficient gain to develop a signal capable of actuating set point selection circuitry in response to the detection of an ambient noise level which is above a pre-selected threshold. This selection circuitry comprises an optional time-delay relay 20 and a set point actuator 22. The output of set point actuator 22 on line 24 is applied to the electric, electronic or pneumatic or other control point of the heating and cooling apparatus in a conventional manner.

Figure 2:
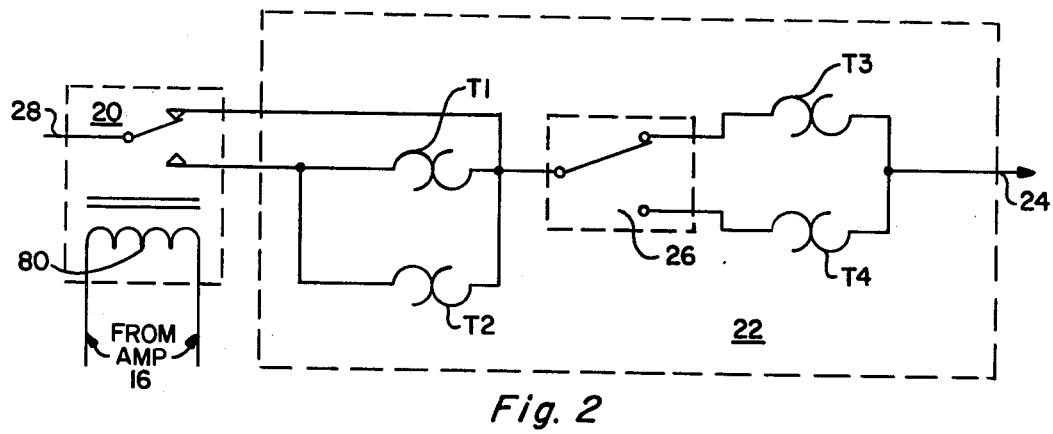
FIG. 2 is a schematic diagram of the set point actuator of the present invention as adapted to control an electrical heating and cooling system and implemented with four thermostats and a summer/winter change-over thermostat.

Set point actuator 22 includes one or more thermostats for controlling the heating and cooling system. If a single thermostat is employed, the set point actuator 22 will vary the single thermostat set point to select the appropriate one of the four status set points indicated above. Alternatively, a plurality of thermostats may be employed, such as indicated in FIG. 2. As shown therein, one thermostat is provided for each status temperature, so that one thermostat is associated with each set point.

Referring specifically to FIG. 2, there is shown an embodiment of the set point actuator 22 comprising four status thermostat, T1 - T4. T1 and T2 are the "occupied status" thermostats for winter and summer, respectively. T3 and T4 are the "unoccupied status" thermostats for winter and summer, respectively. Switch 26 selects either the winter thermostats or the summer thermostats, appropriately, to control either heating or cooling, according to the season. While switch 26 may be manually actuated, it may also comprise a thermostat for automatic winter/summer switch over. Such a thermostat could be placed in the ambient outside environment and set at about 70° F., so that the winter set points would be selected when the outside temperature is below 70° and the summer thermostats would be selected when the outside temperature is above 70°. The thermostats and the switch 26 are part of a series electrical circuit between line 28 and line 24, to supply power to the heating and cooling system directly or to a control circuit which will, in turn, operate the heating and cooling system. Time delay relay ("TDR") 20 is also part of that series circuit. When the monitored room is not occupied. TDR 20 shorts out the occupied status thermostats T1 and T2, thus permitting the unoccupied status thermostats T3 and T4 to control the environment. Conversely, when TDR 20 is energized in response to the room being occupied, it places thermostats T1 and T2 in the series circuit and these dominate the operation of the heating and cooling system even though thermostats T3 and T4 are still part of the series circuit, as the appropriate one of them should remain closed. In this connection the TDR 20 places the T1 and T2 thermostats in the circuit only after a fixed time delay. This delay produces a "jittery" effect and precludes response to noise transients, such as caused by a single person entering the area for only a short interval.

During the heating season, a reduced space temperature setting can be achieved by doing one or more of the following or similar actions, depending on the heating system characteristics: closing the ventilation damper, turning the hot air supply or exhaust fans off, closing the heating valve or cycling the equipment off for periods of time. Correspondingly, during the cooling season one or more the following acts may be done to maintain an elevated space temperature setting: closing the ventilation damper, turning off the supply or exhaust fans, closing the cooling valve, or cycling off the equipment.

Figure 3:
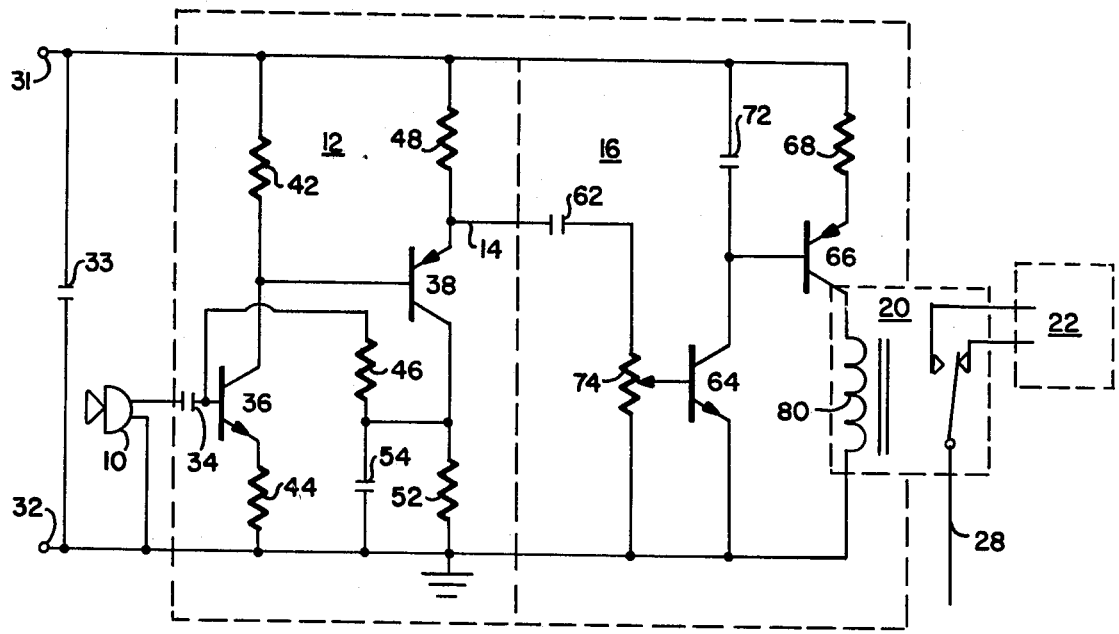
FIG. 3 is a schematic diagram of a basic implementation of the preamplifier and amplifier of FIG. 1.

One basic implementation of the pre-amplifier 12 and amplifiers 16 of FIG. 1 is shown in FIG. 3. In that figure, power is supplied by a DC power source, not shown, across terminals 31 and 32. Capacitor 33 supplies filtering of the power supply output. Pre-amplifier 12 is comprised of capacitor 34; transistors 36 and 38, resistors 42, 44, 46, 48 and 52 and capacitor 54. Microphone 10 is coupled into the pre-amplifier through capacitor 34 and the output of the pre-amplifier on line 14 is connected to the input coupling capacitor 62 of amplifier 16. The remaining components of amplifier 16 are transistors 64 and 66, resistor 68, capacitor 72 and potentiometer 74. Potentiometer 74 provides a gain or sensitivity control. The coil winding 80 of TDR 20 is connected in series with the collector of transistor 66, as the load thereof, so that TDR 20 is energized when sufficient current is drawn through the collector of transistor 66 in response to the detection of a noise level selected by the potentiometer setting.

It is also possible to use more sophisticated audio-detection systems for operation of the TDR 20, such as various intrusion alarms known in the prior art. One such example is shown in U.S. Pat. No. 3,513,463 and there are others.

In operation, the circuit in FIG. 3 does not energize the time-delay relay coil 80 while the room is vacant. When one or more persons enter the room, however, the sounds they produce will be detected by this circuitry and the amplifier 16 will energize the coil 80. After a predetermined interval established by the TDR 20, it will place the T1 and T2 thermostats into the circuit. Normally this will elevate the heat set point and reduce the cooling set point. These new, "occupied" status set points then are maintained until no sound is detected. This condition indicates that the room no longer is occupied, so the time delay relay is deenergized and the "unoccupied" status set points are reestablished.

It is to be noted that the above-described embodiment is intended to be exemplary only and is presented solely for purposes of illustration and not by way of limitation. Accordingly, it is recognized that various alterations, modifications, improvements and the like will occur to those skilled in the art. Thus, it is intended that all such variations and modifications as come within the true spirit and scope of this invention and which occur to those skilled in the art be covered and that this invention be limited only as defined by the appended claims below.

More particularly, what is claimed is:

1. A sound activated temperature control system comprising:

thermostatically operated environmental temperature in a predefined area and providing heating and cooling in that area;

thermostat means having at least first and second temperature set points for controlling said sustaining means thereby to control the temperature in said area, said thermostat means including a set of first and second temperature set points for heating and another set of first and second set points for cooling;

means in said system for selecting one of said sets of set points;

and selector means connected to said thermostat means for sensing the level of audible noise in the area and selecting the first set point of one of said sets in response to the noise level being below a predetermined level and the second set point of said set in response to the noise level exceeding said predetermined level.

2. A sound activated temperature control system comprising:

A. thermostatically operated environmental temperature sustaining means for altering the temperature in a predefined area and providing heating and cooling in that area;

B. thermostat means connected to said sustaining means for controlling said sustaining means, thereby to control the temperature in the area, in response to a set of first and second temperature set points for heating and another set of first and second set points for cooling;

C. noise sensing means for detecting a level of audible noise in the area that exceeds a predetermined threshold level.

D. Selector means connected to said thermostat means and to said sensing means for selecting the first set points of a set when the noise level is below the threshold level and the second set point when the noise level exceeds the threshold level; and E. second selector means connected to said thermostat means for selecting one of said sets of set points.

3. The temperature control system of claim 2 wherein said second selector means comprises second thermostat means responsive to the environmental temperature for selecting the set of set points for heating use when the environmental temperature is below a preselected temperature and to select the set of set points for cooling use when the environmental temperature is above a predetermined temperature.

4. The temperature control circuit of claim 2 or claim 3 wherein said noise sensing means includes means for inhibiting the sensing of brief, transient noises thereby to minimize the operation of said selector means in response to transient conditions.

* * * * *